United States Patent [19]
Loucks

[11] Patent Number: 5,624,174
[45] Date of Patent: Apr. 29, 1997

[54] DISPLAY PANEL MOUNT FOR PROJECTION DISPLAY SYSTEM

[75] Inventor: Bryan E. Loucks, Los Altos Hills, Calif.

[73] Assignee: Kopin Corporation, Taunton, Mass.

[21] Appl. No.: 544,251

[22] Filed: Oct. 17, 1995

Related U.S. Application Data

[63] Continuation of Ser. No. 111,171, Aug. 25, 1993, abandoned.

[51] Int. Cl.⁶ .................................................. G03B 21/14
[52] U.S. Cl. ...................................................... 353/122
[58] Field of Search .......................... 353/122, 33, 81, 353/31; 359/83

[56] References Cited

U.S. PATENT DOCUMENTS

| | | | |
|---|---|---|---|
| 4,864,390 | 9/1989 | McKechnie et al. | 358/60 |
| 4,904,061 | 2/1990 | Aruga | 350/339 |
| 4,909,601 | 3/1990 | Yajima et al. | 350/331 |
| 4,995,702 | 2/1991 | Aruga | 350/331 |
| 5,028,121 | 7/1991 | Baur et al. | 353/81 |
| 5,054,910 | 10/1991 | Kozaki et al. | 353/31 |
| 5,073,013 | 12/1991 | Sonehara et al. | 359/63 |
| 5,075,798 | 12/1991 | Sonehara et al. | 359/490 |
| 5,092,671 | 3/1992 | Van Os | 353/122 |
| 5,098,183 | 3/1992 | Sonehara | 353/31 |
| 5,239,322 | 8/1993 | Takanashi et al. | 353/31 |
| 5,260,728 | 11/1993 | Yoshiota et al. | 353/34 |
| 5,283,599 | 2/1994 | Tejima et al. | 353/34 |
| 5,418,586 | 5/1995 | Fujimori et al. | 353/34 |

FOREIGN PATENT DOCUMENTS

| | | |
|---|---|---|
| 595372A2 | 12/1990 | European Pat. Off. . |
| 450952A3 | 4/1991 | European Pat. Off. . |
| 526652A1 | 2/1992 | European Pat. Off. . |
| 1267587 | 10/1989 | Japan . |
| 4206331 | 7/1992 | Japan . |
| 89/09422 | 10/1989 | WIPO . |

*Primary Examiner*—William Dowling
*Attorney, Agent, or Firm*—Hamilton, Brook, Smith & Reynolds, P.C.

[57] ABSTRACT

Liquid crystal display slides are mounted to a beam combining prism such that each slide can flex in the place of the slide as a result of thermal stresses. A three-point clip mount for each slide is bonded between the prism and the slides.

48 Claims, 4 Drawing Sheets

DISPLAY PANEL MOUNT FOR PROJECTION DISPLAY SYSTEM

RELATED APPLICATION

This application is a continuation of application Ser. No. 08/111,171 filed on Aug. 25, 1993, which is incorporated herein by reference in its entirety, now abandoned.

BACKGROUND OF THE INVENTION

A color image can be synthesized by combining discrete primary color images (e.g., red, green and blue). In display systems using liquid crystal display panels, each primary color image can be generated by a respective display panel. The primary color images are then combined by an optical combiner to form a synthesized color image.

To synthesize an accurate color image, the display panels must be precisely aligned with respect to each other. The display panels must also be precisely aligned with the optical axis of the optical combiner. These alignments cannot be predetermined because there is a large tolerance in the optical properties of individual display panels.

In typical projection display systems using display panels, the display panels are fixed to a supporting structure of the display system. The beam combiner is then inserted in the optical path of the display panels. Such systems cannot be aligned until the display panels and beam combiner are fixed to the display system. Such systems contain many mechanical parts to facilitate image alignment between the optical combiner and the display panels. Assembly workers must have adequate skills to achieve the alignment after assembling the display system.

In projection display systems, the display panels are subjected to thermal stress. The thermal stress can misalign the display panels. A spatial misalignment of the display panels relative to each other or to the optical axis of the optical combiner can degrade the synthesized image.

SUMMARY OF THE INVENTION

Preferred embodiments of the invention are directed to projection display systems using light valve display panels to generate images. In particular, the light valve display panels are active matrix liquid crystal display panels. The active matrix circuitry is preferably fabricated on a single semiconductor wafer. In a preferred embodiment, the display panels are approximately the size of a standard 35 mm photographic slide. As will be apparent, the utility of the invention is applicable to other display panels, including Electroluminescent (EL) display panels, Light-Emitting Diode (LED) arrays, and flexing mirror pixel light valves. Furthermore, the display panel size is not limited to the 35 mm format, other dimensions and aspect ratios can also be used in practicing the invention.

In a preferred embodiment, three display panels are mounted to and aligned with a beam combiner so that when images produced on the display panels are projected onto a screen, the resulting image is in focus and registration for all colors. A preferred embodiment benefits from a low product component cost, a compact assembly, and an alignment process that requires no subjective decisions on the part of a person performing the alignment.

In general, a preferred beam combiner sub-assembly consisting of three display panels attached to a beam combining prism and aligned so that from a projection lens all three display panels and the lens are on a common optical axis and aligned laterally and rotationally about the optical axis to a common orientation. This sub-assembly has appropriate reference surfaces to orient the sub-assembly properly relative to a projection lens and an illumination system without requiring any further adjustments.

A preferred embodiment of the invention is a light valve display system containing light valve display panels and a beam combiner sub-assembly. A plurality of light valve display panels generate respective images and the beam combiner combines the images to form a synthesized image. Each light valve display panel is mounted to the beam combiner by a three point mount.

The three points define a display panel image plane. Mounting clips provide for expansion of each display panel in response to thermal stress. Each display panel can expand in a direction normal to the optical axis of the respective display panel. Because the display panels are in close proximity to each other, the display panels function in a shared environment. As such, the temperature of each display panel will be substantially equal to the temperature to the other display panels. Thus, each display panel will be subjected to equivalent amounts of thermal stress. Consequently, the display panels will expand an equal amount in response to the thermal stress.

A mounting contact point is located near a respective corner of each display panel. A first structure at the inner contact point is rigid in all directions. A second structure at each of the adjacent outer contact points is rigid in one direction in the image plane and flexible in the other direction in the image plane. The corner of the display panel that is diagonal to the first structure is unsupported.

By mounting aligned display panels to the optical combiner, a complete display panel assembly is fabricated. Such an assembly permits the use of smaller beam combiners and display panels than can be used in prior art systems. In addition, the number of mechanical parts that must be supplied with each projection display system and the skill level required to assemble projection display systems is reduced over prior art systems.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular display panel mount embodying the invention is shown by way of illustration only and not as a limitation of the invention. The drawings are not necessarily to scale, emphasis instead being on illustrating principles and features of the invention. The principles and features of this invention may be employed and varied in numerous embodiments without departing from the scope of the invention.

DETAILED DESCRIPTION OF A PREFERRED EMBODIMENT OF THE INVENTION

Figure 1A:
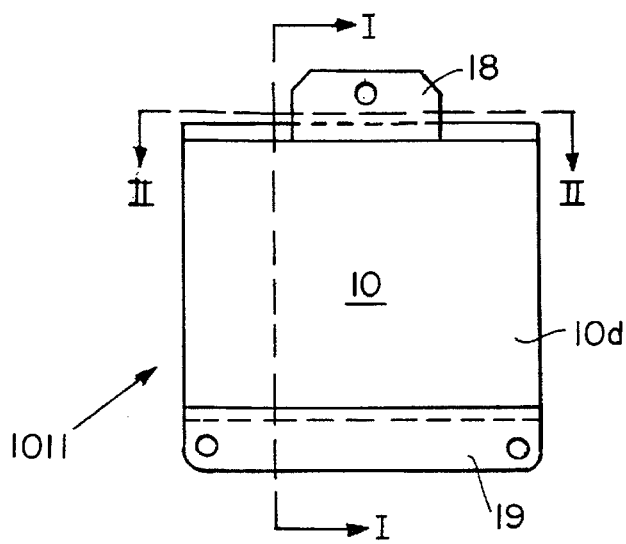
FIGS. 1A–1C are schematic diagrams of a beam combiner assembly.

A beam combining prism 10 does not have any means of mounting or any reference surfaces except four polished faces 10a, 10b, 10c and 10d. The beam combining prism 10 can have any aspect ratio or orientation. In a specific embodiment, a marking indicates which three faces 10, 10b, 10c are input faces and which faces 10d is the output face. A fixture is used to hold the prism 10 in a particular orientation relative to a reference surface 100 on the fixture. The same fixture also locates two metal mounting brackets 18, 19 to capture the prism. The brackets are parallel to the two non-polished surfaces 10e, 10f of the prism. In this fixture, the two mounting brackets 18, 19 are cemented to the prism 10. The adhesive used to cement the mounting brackets 18, 19 to the prism 10 can be chosen from a variety of adhesives commonly used in the optical industry to bond metal to glass.

Figure 1B:
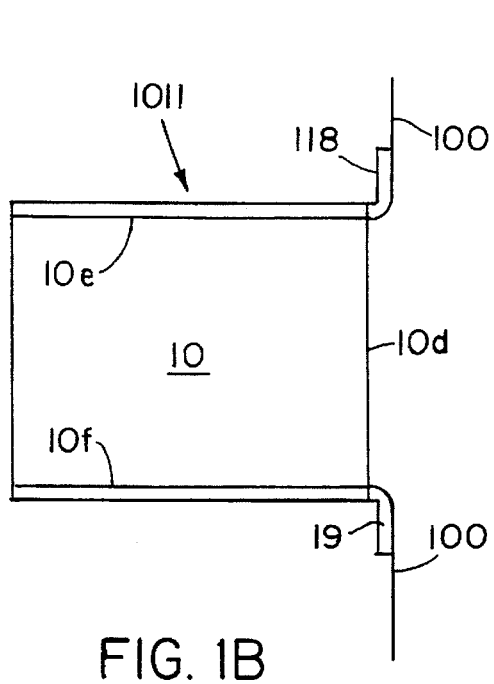
Figure 1C:
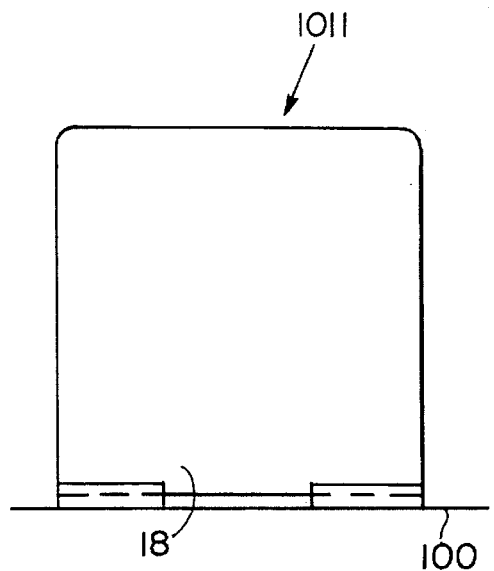

FIGS. 1A–1C are schematic diagrams illustrating the prism 10 and mounting brackets 18, 19 bonded together. FIG. 1A is a front view of the sub-assembly 1011 showing a reference surface 100. As discussed below, the final display panel assembly is coupled to a projection display system at the reference surface 100. Holes in the mounting brackets 18, 19 are locational and holding provisions. The reference surface 100 is parallel to the output face 10d of the prism 10. FIG. 1B is a schematic diagram of the beam combiner sub-assembly 1011 taken along line I—I of FIG. 1A. FIG. 1C is a schematic diagram of the beam combiner sub-assembly 1011 taken along line II—II of FIG. 1A. As illustrated, the mounting brackets 18, 19 cover respective unpolished faces 10e, 10f of the prism 10. It is understood that less than full coverage can be obtained without affecting the scope of the invention.

After the prism 10 has been bonded to the metal mounting brackets 18, 19, image plane mounting clips 12, 13, 14 (shown in FIG. 2) are attached to the mounting brackets 18, 19. The purpose of the clips 12, 13, 14 is to provide an image plane established by three points for each display panel 1000. Each image plane must be optically perpendicular to the reference plane 100 established by the mounting brackets 18, 19 holding the prism 10. In addition to being perpendicular to the optical axis, the image planes must also be located at the same optical distance along the optical axis relative to the reference plane 100.

In a projection display system, the projection lens may suffer from lateral color displacement. The lateral color displacement can be corrected by altering the magnification of the display panel image. Given a projection lens, the displacement of the image plane from the optimal focal point can be calculated for each color image. This displacement can then be used to adjust displacement between each display panel 1000 and the associated input face of the prism 10.

The correction for lateral color displacement is a compromise between focus and magnification. In a preferred embodiment of the invention, the displacement from optimal focus is less than 0.5 mm. In addition, correction of lateral color displacement of telecentric lenses may substantially degrade the focus of the synthesized image.

The mechanism for transferring the located image planes to the mounting brackets 18, 19 of the beam combining prism 10 consist of three clips, the image plane mounting clips 12, 13, 14. Each clip 12, 13, 14 has a flat surface to be bonded to a prism mounting bracket 18, 19 and a spherical surface to be bonded to a display panel 1000. Three clips 12, 13, 14 are used for each display panel 1000. The clips 12, 13, 14 are mounted to the prism mounting brackets 18, 19 so the spherical surfaces are in contact with the mirror plates 23 and positioned so they contact the display panels 1000 near three of the four corners when they are installed. Three contact points are used to avoid stressing the display panels 1000 when they are mounted.

Of the three clips 12, 13, 14 used for each display panel 1000, a first clip 12 is designed to be stiff along the display panel surface in all directions, a second clip 13 is stiff in one direction in the image plane and slightly flexible in the perpendicular direction in the image plane, and a third clip 14 is flexible and stiff in the opposite directions to the second clip 13. This clip stiffness pattern permits the display panel 1000 to be mounted so the first clip 12 establishes the location of the display panel 1000 while the other two clips 13, 14 provide support for the display panel 1000 but permit some slight differential thermal expansion during warmup. This differential expansion occurs because the thermal conductivities of the glass and the metal component are different, even if the thermal expansion coefficients are about equal. The differential expansion for each display panel 1000 should be substantially equal to the differential expansion in each other display panel 1000 in a completed assembly because the display panels 1000 experience substantially the same thermal stress. The display panels 1000 experience the same thermal stress because to the display panels 1000 function in a common environment due to the close proximity of the display panels.

Figure 2:
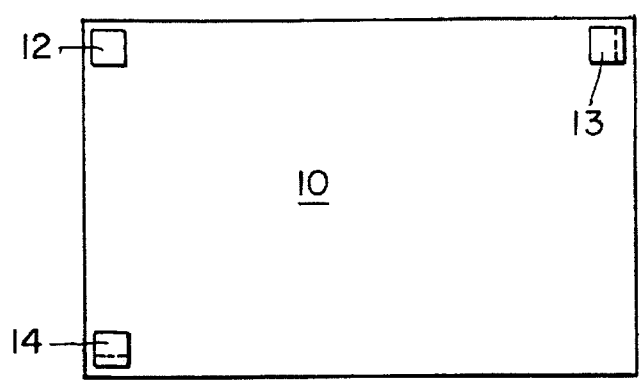
FIG. 2 is a schematic diagram illustrating mounted image plane mounting clips.

FIG. 2 illustrates the mounted positions of the image plane mounting clips 12a, 13a, 14a for one input face 10a of the beam combining prism 10. It should be noted that the positioning of the image plane mounting clips 12, 13, 14 for all three input faces 10a, 10b, 10c must be aligned such that the projection of each image plane mounting clip 12, 13, 14 aligns with the corresponding image plane mounting clips 12, 13, 14. In other words, all projections of the first clips 12 must align with each other, all projections of second clips 13 must align with each other, and all projections of third clips 14 must align with each other.

In a preferred embodiment, the clips 12, 13, 14 are pivot-mounted to the mounting brackets 18, 19 and the clips 12, 13, 14 are pivoted into position. When this contact is achieved, the clips 12, 13, 14 are bonded to the mounting brackets 18, 19. The clips can be bonded to the mounting brackets 18, 19 by a variety of methods, including either spot welding or ultraviolet-activated structural adhesive bonding. In a preferred embodiment, the adhesive is Locktite Impruved 365.

If the display panels 1000 were to be fastened to the clips 12, 13, 14 at this point in the process, an image would appear on the screen that was in good focus over the whole area and for each color. However, the image may require registration between the image and screen boundaries or of color to color. Registration of the images requires the ability to move the display panels 1000 in the plane of the display panel image. This registration can be performed one light path at a time.

After the alignment has been achieved for all three display panels 1000, an ultraviolet curing adhesive that was put on the spherical surfaces of the image plane mounting clips 12, 13, 14 is cured.

Figure 3A:
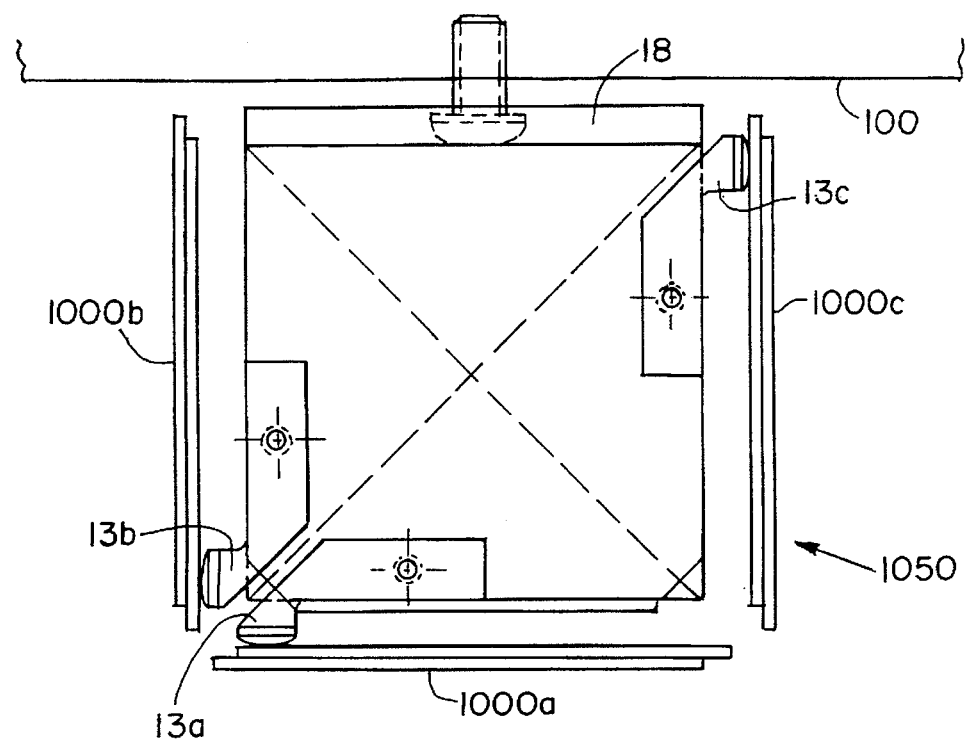
FIGS. 3A–3B are schematic diagrams of a completed display panel and beam combiner assembly.
Figure 3B:
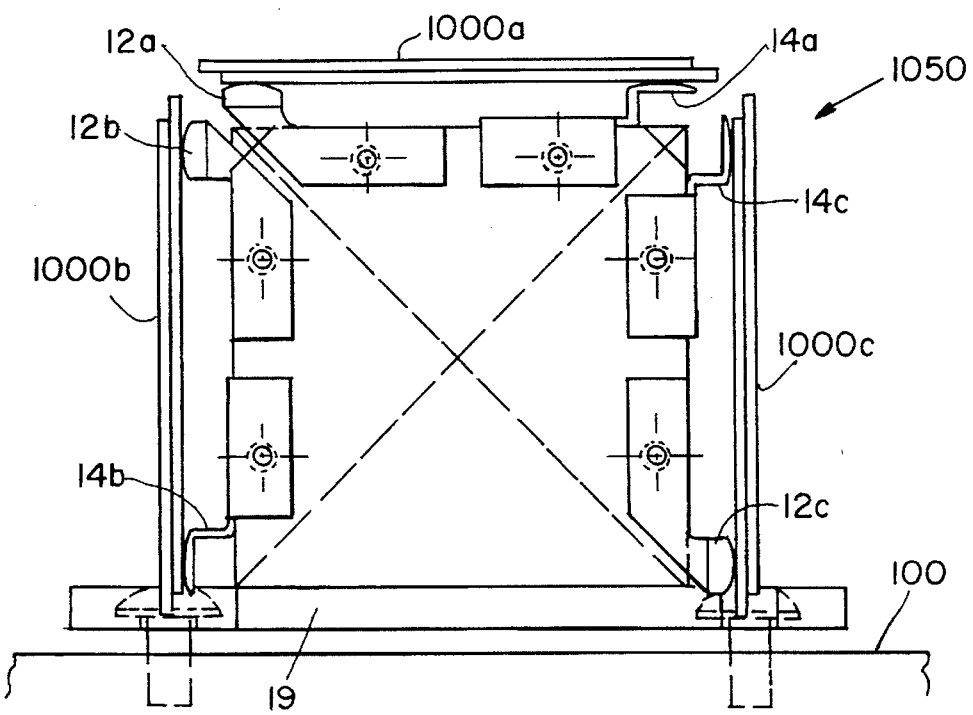

FIGS. 3A–3B illustrate a completed assembly 1050 of display panels 1000, beam combining prism 10, and mounting brackets 18, 19. Illustrated are three display panels 1000a, 1000b, 1000c mounted to the beam combiner assembly 1011 by respective clips 12, 13, 14. For purposes of clarity in the drawings, each view illustrates only those clips 12, 13, 14 that are in the foreground. Thus, it may appear that some edges of the display panels 1000 are unsupported. However, only one corner of each display panel 1000 is in fact unsupported. FIG. 3A is an plan view of the display panel assembly 1050 facing the first mounting bracket 18. As illustrated, the respective second mounting clips 13 fixed to the first mounting bracket 18. Not shown are the first mounting clips 12 and third mounting clips 13. FIG. 3B is a plan view of the display panel assembly facing the second mounting bracket 19. As illustrated, the respective first mounting clips 12 and third mounting clips 14 are fixed to the second mounting bracket 19. Not shown in FIG. 3B are the second mounting clips 13.

The use of a spherical surface at the display panel/clip interface is useful for more than just establishing three points to form the display panel image plane. When the display panel 1000 is bonded to a clip, the bond line at the contact point is close to zero thickness. If this were the only bond point, the joint would probably fail with temperature cycling because there would be no adhesive thickness to distribute the shear forces between the display panel 1000 and clip. The spherical surface provides a varying thickness of adhesive to survive such shear forces.

Figure 4:
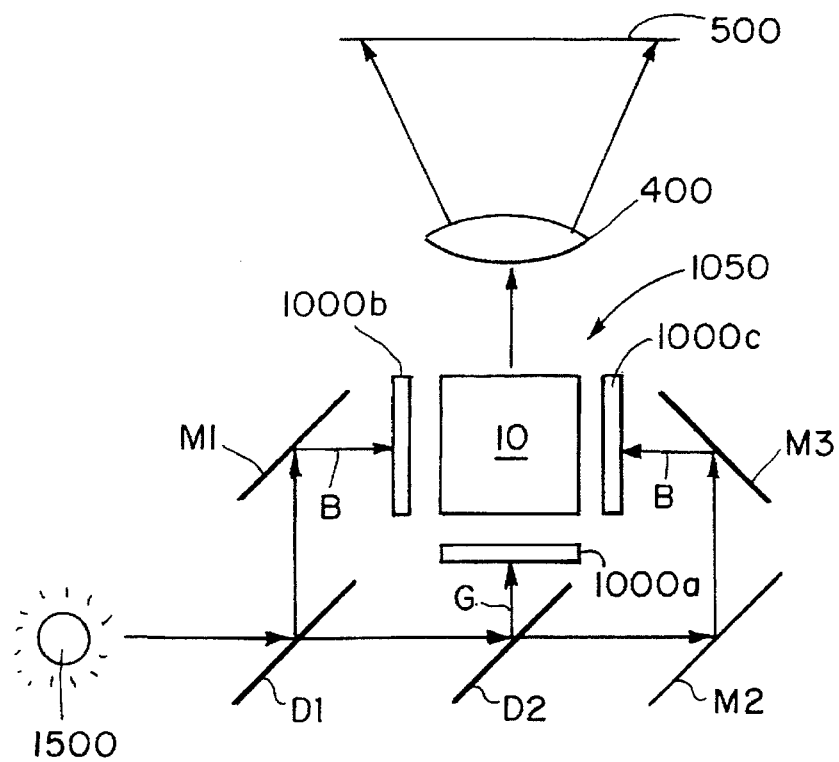
FIG. 4 is an optical diagram of a completed display panel assembly integrated into a projection display system.

FIG. 4 is an optical diagram of a completed display panel assembly 1050 integrated into a projection display system. The projection display system includes a light source 1500 and a projection lens 400. Light from the light source 1500 is transmitted toward a dichroic mirror pair and reflection mirrors. The dichroic mirror pair includes a blue light reflection dichroic mirror D1 and a green light reflection dichroic mirror D2. The dichroic mirror pair segregates the light from the light source 1500 into primary colors. Blue light reflected by the blue light reflection dichroic mirror D1 is reflected by a first mirror M1 and becomes incident on a first display slide 1000b. The green light reflection dichroic mirror D2 reflects green light toward a second display panel 1000a. The remaining red light is reflected by a second mirror M2 toward a third mirror M3 which reflects the red light toward a third display panel 1000c. The synthesized red-green-blue (RGB) image is outputted by the beam combiner 10 of the display panel assembly 1050. The RGB image is projected by the projection lens 400 onto a viewing screen 500. Further details regarding preferred projection displays can be found in U.S. Ser. No. 08/015,813 filed on Feb. 10, 1993, which is incorporated herein by reference.

Figure 5B:
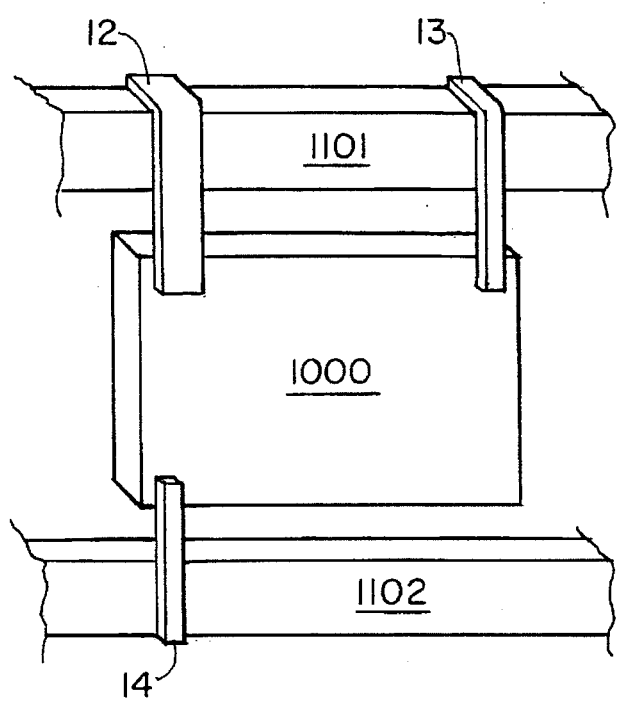
FIG. 5B is a perspective view of a display panel 1000 mounted to a frame of the projection display system of FIG. 5A.
Figure 5A:
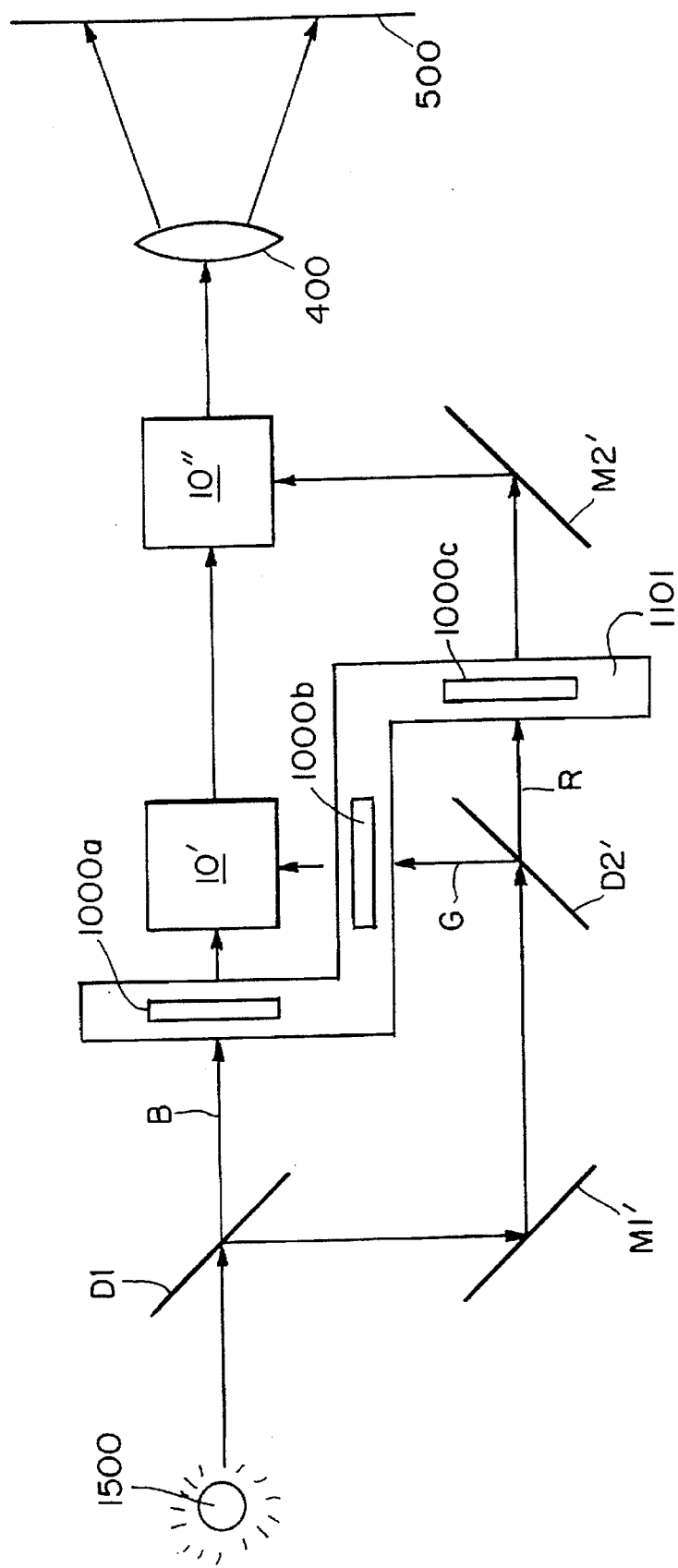
FIG. 5A is an optical diagram of another projection display system.

FIG. 5A is an optical diagram of another preferred projection display system. As illustrated, light from a light source 1500 is split by a blue passing dichroic mirror D1'. The blue light passes through a first display panel 1000a and enters a first beam combiner 10'. Light reflected by the blue light passing dichroic mirror D1' is reflected by a first mirror M1'. This reflected light is split by a green light reflection dichroic mirror D2'. The reflected green light passes through a second display panel 1000b and enters the first beam combiner 10'. The passed red light passes through a third display panel 1000c and is reflected by a second mirror M2'. A second beam combiner 10" combines the red light and the combined blue and green light from the first beam combiner 10' to synthesize the RGB image. The RGB image is projected by the projection lens 400 onto a viewing surface 500.

FIG. 5B is a perspective view a display panel 1000 mounted to a frame of the projection display system of FIG. 5A. As illustrated, the display panel 1000 is mount to the first and second supporting frames 1101 and 1102. The slide 1000 is mounted by image plane mounting clips 12, 13, 14. The clips 12, 13, 14 provide three contact points defining the image plane and flex in the same manner described above.

Equivalents

Those skilled in the art will know, or be able to ascertain using no more than routine experimentation, many equivalents to the specific embodiments of the inventions described herein.

These and all other equivalents are intended to be encompassed by the following claims.

The invention claimed is:

1. A projection display system comprising:

three display panels, a first display panel generating a red color image, a second display panel generating a green-color image, and a third display panel generating a blue-color image;

an optical combiner having an optical axis for optically combining the generated images to form a synthesized image; and a plurality of three-point flexible mounts, each display panel being fixed in an image plane positioned relative to the optical axis of the optical combiner by a respective mount that is attached to the display panel such that the generated images are registered to form the synthesized image, each mount arranged to permit movement of the respective display panel relative to the optical combiner during operation of the projection display system.

2. The projection display system of claim 1 wherein each mount is rigid in a first direction and flexible in a second direction.

3. The projection display system of claim 1 wherein the display panels are active matrix liquid crystal display panels.

4. The projection display system of claim 1 wherein the optical combiner is a prism.

5. The projection display system of claim 1 wherein the mounts permit thermal expansion of the display panels in a respective image plane.

6. The projection display system of claim 5 wherein, for each display panel, a first mount point of the mount is rigid in three orthogonal directions relative to the image plane, a second mount point of the mount is flexible in a first direction along the respective image plane and rigid in all other directions, and a third mount point of the mount is flexible in a second direction along the respective image plane and rigid in all other directions.

7. The projection display system of claim 6 wherein the first mount point is adjacent to both the second and the third mount points.

8. The projection display system of claim 1 wherein the mounts are fixed to the optical combiner.

9. The projection display system of claim 1 wherein the mounts are fixed to a supporting frame of the projection display system.

10. A liquid crystal projection display system comprising:

a plurality of liquid crystal display panels for generating respective images;

a light source to direct light through each display panel;

a beam combining prism having an optical axis for optically combining the generated images to form a synthesized image;

a plurality of flexible mounts, each display panel being fixed in an image plane positioned relative to the optical axis of the beam combining prism by a respective flexible mount attached to the display panel, each flexible mount permitting movement of the respective display panel relative to the prism during operation of the projection display system such that the generated images are registered to form the synthesized image; and an optical system for projecting the synthesized image onto a display surface.

11. The projection display system of claim 10 wherein there are three display panels, a first display panel generating a red-color image, a second display panel generating a green-color image, and a third display panel generating a blue-color image.

12. The projection display system of claim 10 wherein the display panels are active matrix liquid crystal display panels.

13. The projection display system of claim 10 wherein the mounts permit thermal expansion of the display panels in a respective image plane.

14. The projection display system of claim 13 wherein, for each display panel, a first mount point of the mount is rigid in three orthogonal directions relative to the image plane, a second mount point of the mount is flexible in a first direction along the respective image plane and rigid in all other directions, and a third mount point of the mount is flexible in a second direction along the respective image plane and rigid in all other directions.

15. The projection display system of claim 10 wherein a cavity between each display panel and the beam combining prism is selected such that the displacement between the display panel and a position at optimal focus is less than 0.5 mm.

16. The projection display system of claim 13 wherein the mounts are fixed to the beam combining prism.

17. The projection display system of claim 14 wherein the mounts are fixed to a supporting frame of the projection display system.

18. A projection display system comprising:

three display panels, each display panel generating a respective images of a respective color;

a light source, a plurality of mirrors and a plurality of dichroic beamsplitters to direct light from the source onto each display panel;

a beam combiner having an optical axis for optically combining the generated images to form a synthesized image; and a plurality of three-point flexible mounts, each display panel being fixed in an image plane positioned relative to the optical axis of the beam combiner by a respective mount that is attached to the display panel such that the generated images are registered to form the synthesized image, each mount arranged to permit movement of the respective display panel relative to the combiner during operation of the projection display system.

19. The projection display system of claim 18 further comprising a second beam combiner.

20. A projection display system comprising:

a plurality of display panels for generating respective images;

an optical combining prism having an optical axis for optically combining the generated images to form a synthesized image; and a plurality of three-point mounts, each display panel being fixed in an image plane positioned relative to the optical axis of the combining prism by one of the three point mounts.

21. The projection display system of claim 20 wherein there are three display panels, a first display panel generating a red-color image, a second display panel generating a green-color image, and a third display panel generating a blue-color image.

22. The projection display system of claim 20 wherein the display panels are active matrix liquid crystal display panels.

23. The projection display system of claim 20 wherein the three-point mounts permit thermal expansion of the display in a respective image plane.

24. The projection display system of claim 23 wherein, for each display panel, a first mount point is rigid in three orthogonal directions relative to the image plane, a second mount point is flexible in a first direction along the respective image plane and rigid in all other directions, and a third mount point is flexible in a second direction along the respective image plane and rigid in all other directions.

25. The projection display system of claim 24 wherein the first mount point is adjacent to both the second and the third mount points.

26. The projection display system of claim 20 wherein the three-point mounts are fixed to the beam combiner.

27. The projection display system of claim 20 wherein the three-point mounts are fixed to a supporting frame of the projection display system.

28. A projection display system comprising:

three display panels, a first display panel generating a red-color image, a second display panel generating a green-color image, and a third display panel generating a blue-color image;

a prism having an optical axis for optically combining the generated images to form a synthesized image; and a plurality of three-point mounts, each display panel being fixed in an image plane positioned relative to the optical axis of the prism by a respective mount such that the generated images are registered to form the synthesized image.

29. The projection display system of claim 28 wherein the display panels are active matrix liquid crystal display panels.

30. The projection display system of claim 28 wherein the mounts permit thermal expansion of the display panels in a respective image plane.

31. The projection display system of claim 30 wherein, for each display panel, a first mount point of the mount is rigid in three orthogonal directions relative to the image plane, a second mount point of the mount is flexible in a first direction along the respective image plane and rigid in all other directions, and a third mount point of the mount is flexible in a second direction along the respective image plane and rigid in all other directions.

32. The projection display system of claim 31 wherein the first mount point is adjacent to both the second and the third mount points.

33. The projection display system of claim 28 wherein the mounts are fixed to the prism.

34. The projection display system of claim 28 wherein the mounts are fixed to a supporting frame of the projection display system.

35. A projection display system comprising:

three display panels, a first display panel generating a red-color image, a second display panel generating a green-color image, and a third display panel generating a blue-color image;

an optical combiner having an optical axis for optically combining the generated images to form a synthesized image; and a plurality of three-point mounts, each display panel being fixed in an image plane positioned relative to the optical axis of the optical combiner by a respective mount such that the generated images are registered to form the synthesized image, the mounts permitting thermal expansion of the display panels in a respective image plane.

36. The projection display system of claim 35 wherein the display panels are active matrix liquid crystal display panels.

37. The projection display system of claim 35 wherein the optical combiner is a prism.

38. The projection display system of claim 35 wherein, for each display panel, a first mount point of the mount is rigid in three orthogonal directions relative to the image plane, a second mount point of the mount is flexible in a first direction along the respective image plane and rigid in all other directions, and a third mount point of the mount is flexible in a second direction along the respective image plane and rigid in all other directions.

39. The projection display system of claim 38 wherein the first mount point is adjacent to both the second and the third mourn points.

40. The projection display system of claim 35 wherein the mounts are fixed to the optical combiner.

41. The projection display system of claim 35 wherein the mounts are fixed to a supporting frame of the projection display system.

42. A liquid crystal projection display system comprising:

a plurality of liquid crystal display panels for generating respective images;

a light source to direct light through each display panel;

a beam combining prism having an optical axis for optically combining the generated images to form a synthesized image;

a plurality of mounts, each display panel being fixed in an image plane positioned relative to the optical axis of the beam combining prism by a respective mount such that the generated images are registered to form the synthesized image, the mounts permitting thermal expansion of the display panels in a respective image plane; and an optical system for projecting the synthesized image onto a display surface.

43. The projection display system of claim 42 wherein there are three display panels, a first display panel generating a red-color image, a second display panel generating a green-color image, and a third display panel generating a blue-color image.

44. The projection display system of claim 42 wherein the display panels are active matrix liquid crystal display panels.

45. The projection display system of claim 42 wherein, for each display panel, a first mount point of the mount is rigid in three orthogonal directions relative to the image plane, a second mount point of the mount is flexible in a first direction along the respective image plane and rigid in all other directions, and a third mount point of the mount is flexible in a second direction along the respective image plane and rigid in all other directions.

46. The projection display system of claim 42 wherein a cavity between each display panel and the beam combining prism is selected such that the displacement between the display panel and a position at optimal focus is less than 0.5 mm.

47. The projection display system of claim 42 wherein the mounts are fixed to the beam combining prism.

48. The projection display system of claim 42 wherein the mounts are fixed to a supporting frame of the projection display system.

* * * * *